(12) United States Patent
Wilson et al.

(10) Patent No.: US 8,001,988 B2
(45) Date of Patent: Aug. 23, 2011

(54) VERIFIABLE CLOSING AND LOCKING SYSTEM OF A CYLINDRICAL PASSAGEWAY

(75) Inventors: Buddy A. Wilson, Sapulpa, OK (US);
Randy B. Billington, Sapulpa, OK (US);
Bruce W. Bingham, Coweta, OK (US);
Tony R. Garrison, Bixby, OK (US);
Mark A. Morgan, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 414 days.

(21) Appl. No.: 12/135,831

(22) Filed: Jun. 9, 2008

(65) Prior Publication Data

US 2009/0301568 A1     Dec. 10, 2009

(51) Int. Cl.
*F17D 3/00*     (2006.01)
*F17D 1/00*     (2006.01)

(52) U.S. Cl. ............... 137/15.01; 137/15.12; 137/317; 138/89; 138/94; 285/24

(58) Field of Classification Search ........... 137/15.01, 137/317, 15.12; 138/89, 90, 92, 94; 285/24
See application file for complete search history.

(56) References Cited

U.S. PATENT DOCUMENTS

| | | | |
|---|---|---|---|
| 2,010,200 A | 8/1935 | Rufener et al. | |
| 2,281,145 A | 4/1942 | Duey | |
| 2,287,750 A | 6/1942 | Clayton | |
| 2,431,778 A | 12/1947 | Sosaya | |
| 2,512,041 A | 6/1950 | Steele | |
| 3,047,266 A | 7/1962 | VerNooy | |
| 3,114,528 A | 12/1963 | Forest | |
| 3,155,116 A | 11/1964 | Ver Nooy | |
| 3,179,446 A | 4/1965 | Paterson | |
| 3,483,894 A | 12/1969 | Finocchiaro | |
| 3,765,456 A | 10/1973 | Karpenko | |
| 3,766,947 A | 10/1973 | Osburn | |

(Continued)

FOREIGN PATENT DOCUMENTS

EP     1325259     8/2006

OTHER PUBLICATIONS

PCT Patent Office, "Notif. of Trans. of Intl Search Report/Written Opinion of the Intl Searching Authority," PCT Patent Office, (Jul. 16, 2009).

(Continued)

*Primary Examiner* — Kevin Lee
(74) *Attorney, Agent, or Firm* — Gable Gotwals

(57) ABSTRACT

A method according to this invention employs a set of valves, a series of pressure checks, and a physical stop for verifying the closing of a locking system of a cylindrical passageway. The method may also employ an equalization piping. The valves isolate a tapping machine, a pipeline, and the equalization piping from one another so that product cannot flow from one to the other. The valves are then opened as a series of pressure checks are performed. A completion plug is then lowered into the passageway until the plug comes to rest within the passageway and is oriented so that a locking ring of the plug is in a filly expanded position. The expanded position is then confirmed by raising the plug until its upward travel is restricted. The plug is then released and pressure above the plug is reduced to 0 psi gauge.

16 Claims, 12 Drawing Sheets

U.S. PATENT DOCUMENTS

| | | |
|---|---|---|
| 3,991,791 A | 11/1976 | Luckenbill |
| 4,144,909 A | 3/1979 | Harrison |
| 4,377,185 A | 3/1983 | Katz |
| 4,387,740 A | 6/1983 | Vanzant |
| 4,466,550 A | 8/1984 | Sullivan |
| 4,576,778 A | 3/1986 | Ferree et al. |
| 4,609,209 A | 9/1986 | Ralls |
| 4,693,278 A | 9/1987 | Wilson et al. |
| 4,880,028 A | 11/1989 | Osburn et al. |
| 4,902,043 A | 2/1990 | Zillig et al. |
| 5,035,266 A | 7/1991 | Benson et al. |
| 5,038,830 A | 8/1991 | Arnaud |
| 5,437,309 A | 8/1995 | Timmons |
| 5,439,331 A | 8/1995 | Andrew et al. |
| 5,450,765 A | 9/1995 | Stover |
| 5,975,142 A | 11/1999 | Wilson |
| 6,012,878 A | 1/2000 | Hicks |
| 6,286,553 B1 | 9/2001 | Morgan |
| 6,648,562 B1 | 11/2003 | Calkins et al. |
| 7,270,139 B2 * | 9/2007 | Calkins et al. ............. 137/15.12 |
| 7,311,114 B2 * | 12/2007 | Morrison et al. .......... 137/15.12 |
| 7,353,839 B2 | 4/2008 | Calkins et al. |

OTHER PUBLICATIONS

International Preliminary Report on Patentability issued on Dec. 23, 2010 by The International Bureau of WIPO in PCT/US2009/045426.

* cited by examiner

VERIFIABLE CLOSING AND LOCKING SYSTEM OF A CYLINDRICAL PASSAGEWAY

REFERENCE TO PENDING APPLICATIONS

This application is not based upon any pending domestic or international patent applications.

BACKGROUND OF THE INVENTION

It is frequently necessary to close an opening in a tubular member either permanently or semi-permanently, that is, to close an opening where a valve is not required or is not desirable. One example of a semi-permanent closure arises when a hot tap is made into a pipeline or a vessel through a fitting connected to the pipeline or vessel. In the typical hot tapping application as utilized in the petroleum industry, a fitting is welded on the exterior of a pipe that has flowing gas or liquid under pressure. The fitting includes a flange on its outlet connection and a hot tapping machine is secured to the flange. By use of highly specialized equipment, a hole can then be drilled through the wall of the pipe while a gas or liquid continues to flow through it to provide access to the interior of the pipe, such as for inserting equipment to temporarily block flow through the pipe while repairs are being made to it. After the repairs are complete, the equipment is removed but the opening that provides communication to the interior of the pipe needs to be closed. Preferably the closure is made in such a way that at some future date access can be again obtained through the fitting to the interior of the pipe.

Because the tubular member is under pressure, a closure member must be in a properly locked position before the closure member is exposed to atmospheric pressure. An improperly locked closure member can blow out, causing serious injury to an operator or other persons nearby. Therefore, it is critically important that the operator know as a certainty that the closure member is properly locked. That is, the operator can verify with certainty that a plug member within a cylindrical passageway leading to the opening is in its proper position and that a lock ring or a retainer leaf, whether one radially expandable ring or leaf or a pivoted pair of lock rings or leaves, is in its proper and secure position within a circumferential groove of the cylindrical passageway before exposing the area above the closure member to atmospheric pressure.

BRIEF SUMMARY OF THE INVENTION

A locking system for closing a cylindrical passageway to a pipeline carrying liquid or gas typically involves the use of a completion plug member having one or more locking rings or leaves located on a top surface of the plug member. The leaves are capable of extending outwardly from a centerline of the plug member. The plug member comprises a cylindrical plug body and a plug holder. The plug holder is connected to a boring bar of the tapping machine. The boring bar lowers the plug member into the passageway, the passageway typically being a fitting flange, and the leaves extend outward to engage an inner portion of the passageway and hold the plug body in place. However, it is important that the plug body be in its proper locked position within the passageway before its release from the boring bar. Otherwise, the plug body could blow out and severely injure or kill an operator.

A method for verifying closing of the locking system involves a set of valves and a piping system in communication with the pipeline and the tapping machine. A sandwich valve connects a lower end of the tapping machine to the passageway. Equalization piping connects an upper portion of the tapping valve to a second cylindrical passageway connected to the pipeline and located downstream of the tapping machine. The equalization piping has a tapping valve at an end nearest the pipeline, an equalization valve at the other end, and a pressure gauge located between these two valves. The tapping machine has a bleeder valve as well as a pressure gauge. The sandwich valve contains an internal bypass valve.

By closing the tapping valve, equalization valve, internal bypass valve, and sandwich valve, the pipeline, tapping machine, and equalization piping are isolated from one another so as to prevent product flow one to the other. The tapping machine pressure is then equalized to the pipeline pressure by opening the tapping valve, internal bypass valve, and purging air from the tapping machine. After the air has been purged, the bleeder valve is closed. If a pressure check confirms that the tapping machine pressure and the pipeline pressure are equal, the equalization valve and the sandwich valve are opened in turn.

The boring bar then lowers the plug body—the leaves of the plug body being in a collapsed position—into and through the sandwich valve and into the passageway, stopping, however, before the plug body comes to a complete stop within the passageway. If the pipeline pressure and the tapping machine pressure remain equal, the boring bar further lowers the plug body until it comes to a complete stop within the passageway. After the plug body comes to a complete stop, a worm shaft of the tapping machine is turned in a clockwise direction, thereby rotating the boring bar and the plug holder. As the plug holder rotates, the leaves of the plug body extend outward from a centerline of the plug body and into a groove located on an internal surface of the passageway. After the leaves are expanded fully, the feed screw is rotated clockwise to raise the plug holder and confirm by encountering resistance that the leaves are in their expanded position within the groove.

The plug holder is then released from the boring bar by rotating a measuring rod counterclockwise, this allows an interlock to position itself between the leaves and prevent the leaves from returning to their collapsed position. The tapping valve is closed and the bleeder valve is opened to reduce pressure above the plug body to 0 psi gauge pressure. The boring bar is retracted and the tapping machine and sandwich valve are removed. If the pressure above the plug body will not reduce to 0 psi gauge, this indicates that the interlock is not in its closed position and the leaves are not locked in their expanded position.

A better understanding of the invention will be obtained from the following description of the preferred embodiments and the claims, taken in conjunction with the attached drawings.

DETAILED DESCRIPTION OF THE PREFERRED EMBODIMENTS

Figure 1:
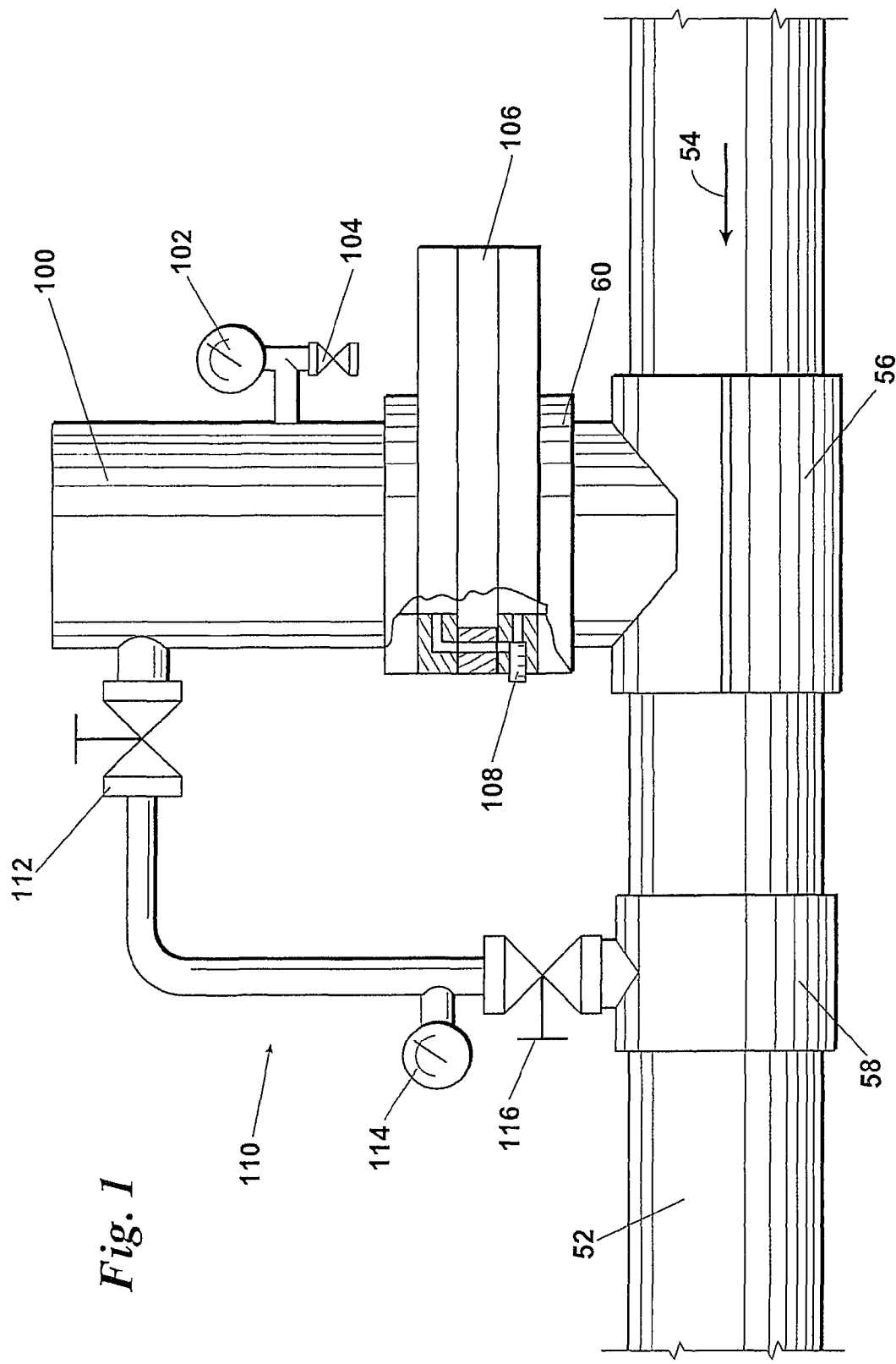
FIG. 1 is a view of the environment for practicing a method according to this invention. A pipeline containing liquid or gas is fitted with a first and second pipeline clamp, each clamp having a fitting flange. The first pipeline clamp is connected to a sandwich valve and a tapping machine connected to the sandwich valve cuts an opening in the pipeline. The first fitting flange, therefore, creates a cylindrical passageway to an interior portion of the pipeline. A pipeline plugger (not shown) is passed through the passageway and into the interior of the pipeline to stop product flow through the pipeline. A second opening is then cut in the pipeline to create a second cylindrical passageway into the pipeline through the second fitting flange. Equalization piping is installed between the second pipeline clamp and the tapping machine.

It is to be understood that the invention that is now to be described is not limited in its application to the details illustrated in the accompanying drawings. The invention is capable of other embodiments and of being practiced or carried out in a variety of ways. The phraseology and terminology employed herein are for purposes of description and not limitation. Elements illustrated in the drawings are identified by the following numbers:

| | |
|---|---|
| 10 | Process |
| 12-50 | Steps in process |
| 52 | Pipeline |
| 54 | Product flow |
| 56 | Pipeline clamp |
| 58 | Second pipeline clamp |
| 60 | Flange |
| 70 | Circumferential Ledge |
| 76 | Circumferential groove |
| 80 | Cylindrical surface |
| 82 | Cylindrical surface |
| 84 | Circumferential ledge |
| 86 | Plug body |
| 90 | Top surface |
| 92 | Circumferential groove |
| 94 | O-ring |
| 100 | Tapping machine |
| 102 | Pressure gauge |
| 104 | Bleeder valve |
| 106 | Sandwich valve |
| 108 | Internal bypass valve |
| 110 | Equalization piping |
| 112 | Equalization valve |
| 114 | Pressure gauge |
| 116 | Tapping valve |
| 136 | Opening |
| 162 | Opening |

-continued

| | |
|---|---|
| 234 | Cylindrical guide |
| 236 | Reduced opening |
| 238 | Bottom surface |
| 240 | Frusto-conical opening |
| 242 | Cylindrical lower opening |
| 244 | Valve stem |
| 248 | Valve head |
| 250 | Sealing surface |
| 252 | Groove |
| 254 | Seal |
| 255 | Spring |
| 258 | First leaf |
| 260 | Second leaf |
| 262 | Semicircular peripheral edge |
| 264 | Straight inner edge |
| 266 | Pivot pin |
| 268 | Guide slot |
| 270 | Guide bolt |
| 272 | Cam surface slot |
| 274 | First plug holder bolt slot |
| 276 | Second plug holder bolt slot |
| 278 | Plug holder |
| 280 | Flange portion |
| 282 | Bolt |
| 284 | Threaded recess |
| 286 | Opening |
| 288 | Tubular standoff |
| 290 | Lower end |
| 292 | Rotatable actuating portion |
| 294 | Opening |
| 296 | Bearing |
| 298 | Plate |
| 299 | Screw |
| 300 | Boss portion |
| 302 | Semicircular recess |
| 304 | Central opening |
| 306 | Rod |
| 308 | Gasket |

The practice of tapping a pipeline under pressure is frequently referred to as "hot tapping." In a typical hot tapping operation, a pipeline containing a fluid or gas is fitted with a clamp having elastomeric seals, a branch outlet, and a fitting flange. Once the clamp is secured to the pipeline, a sandwich valve having an internal bypass valve is connected to the fitting flange. The clamp is of a type well-known in the art and seals around tie pipeline; the sandwich valve, which is also of a type well-known in the art, provides a control outlet, isolating pressure once a hole is cut in the pipeline.

A tapping machine is then attached to the sandwich valve. The tapping machine is of a type well-known in the art, typically formed of an elongated, tubular body containing a rotating boring bar. The lower end of the body is provided with means, such as a flange, by which it is secured to the sandwich valve. A gearbox or drive mechanism is affixed to the upper end of the tapping machine body and provides means for rotation of the boring bar. The lower end of the boring bar is equipped to receive a cutter as well as other tools and equipment, including a removable closure member such as the one described herein. To cut a hole in the pipeline, the sandwich valve is opened to allow the cutter to contact and penetrate the pipeline. Once the pipeline is penetrated, the tapping machine fills with pipeline product and air is purged from tie tapping machine through a bleeder valve. After cutting the hole, the cutter is withdrawn through the sandwich valve and a pipeline plugger (not shown) is inserted into an interior portion of the pipeline so that pipeline service operations can commence. The fitting flange provides a cylindrical passageway into the interior portion of the pipeline.

Once service operations are complete and the pipeline plugger is removed, the opening in the pipeline must be closed, preferably with a removable closure apparatus, so that the tapping machine and sandwich valve can be removed in a safe manner. This type of closure apparatus is well-known in the art. One closure apparatus that is particularly well-suited for use in the method described herein is found in Wilson et al., WO02/18835, Morgan, U.S. Pat. No. 6,286,553, and Wilson, U.S. Pat. No. 5,975,142. The typical closure apparatus contains a plugging body having one or more locking rings or retainer leaves. The leaves engage an inner portion of the fitting flange, usually a circumferential ledge or groove, thereby holding the plugging member in place. However, it is important that the plugging body be in its proper locked position with the fitting flange and that any pipeline pressure applied against the plug body is relieved. Otherwise, the plug body could blow out of the opening and severely injure or kill an operator.

As illustrated by FIG. 1, in a preferred embodiment of a method according to this invention, a tapping machine 100 having a pressure gage 102 and a bleeder valve 104 is connected to a sandwich valve 106 having an internal bypass valve 108. Sandwich valve 106, in turn, is connected to a first pipeline clamp 56 having elastomeric seals and a fitting flange 60. Equalization piping 110 connects an upper portion of tapping machine 100 to a second pipeline clamp 58 located downstream of the tapping machine 100 relative to product flow 54. Equalization piping 110 has an equalization valve 112 located at an end nearest the tapping machine 100 and a tapping valve 116 located at the opposite end. Equalization piping 110 also has a pressure gauge 114 located between tapping valve 116 and equalization valve 112.

Figure 2:
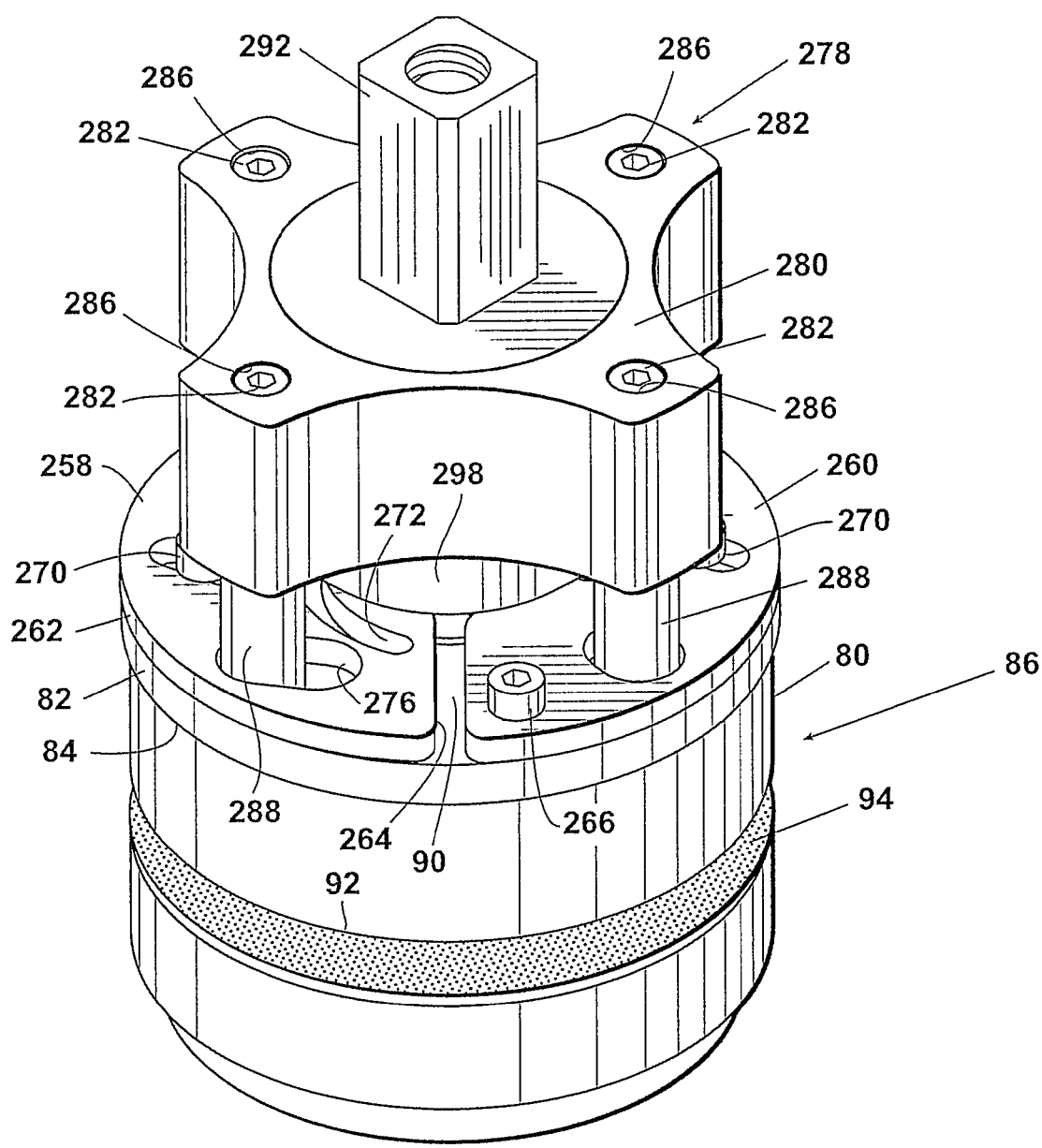
FIG. 2 is an isometric view of a completion plug member that is inserted into or removed from a cylindrical opening in a pipe. The plug member comprises a cylindrical plug body and a plug holder.

To provide for a removable closure, a closure member having a plug holder 278 and a cylindrical plug body 86 (see FIG. 2) is attached to the boring bar (not shown) of tapping machine 100 and lowered into a cylindrical opening of fitting flange 60. Plug body 86 has a top surface 90 and cylindrical walls defined by a first external cylindrical surface 80 and a slightly larger external surface 82. The difference in diameters of cylindrical surfaces 80 and 82 results in a circumferential ledge 84. An external circumferential groove 92 in cylindrical surface 80 receives a large O-ring 94. Positioned in a common plane on plug body 86 is a first leaf 258 and a second leaf 260.

Figure 3:
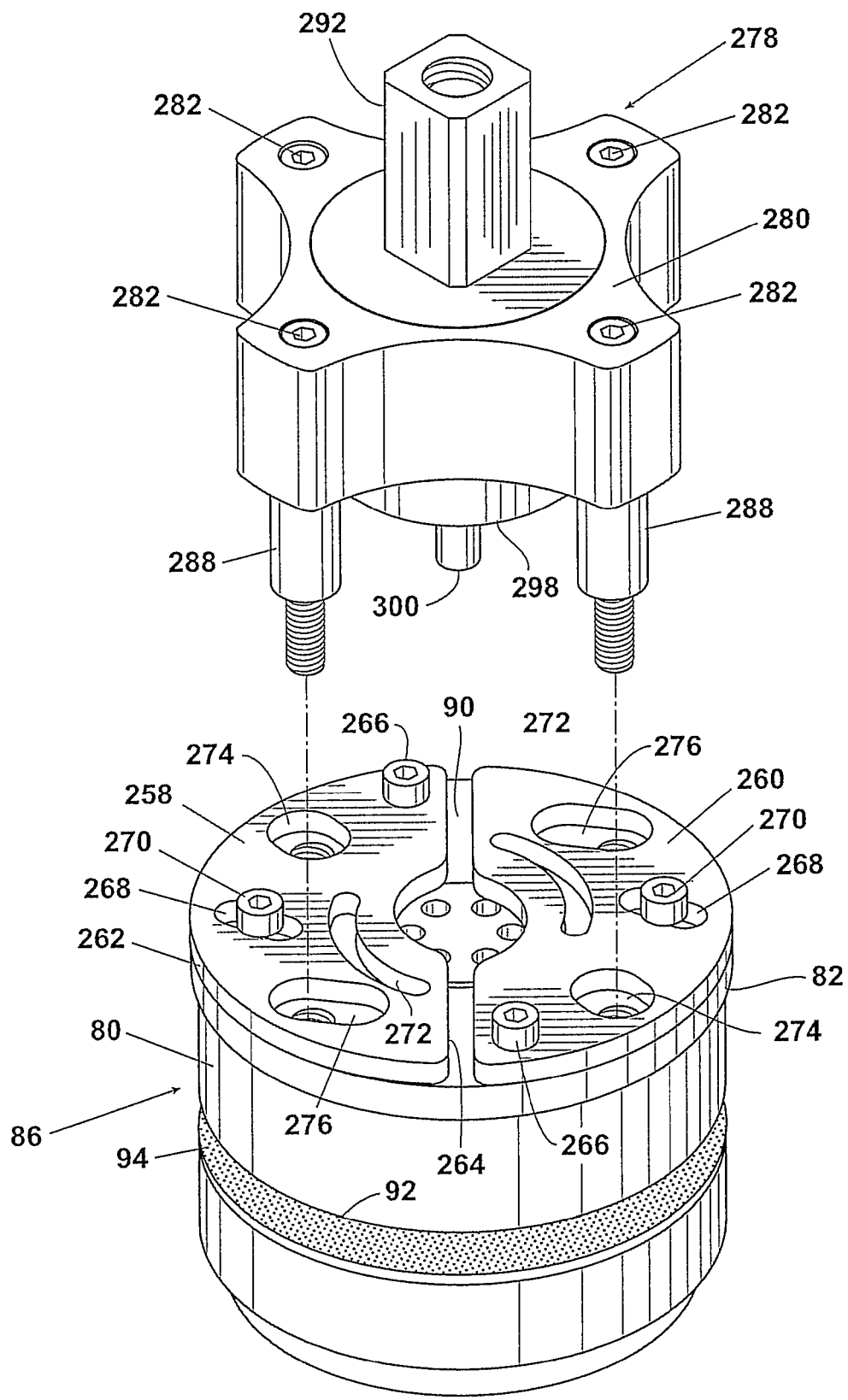
FIG. 3 is an exploded view of the plug member showing a first retainer leaf and a second retainer leaf of the plug in their open and unlocked position.
Figure 4:
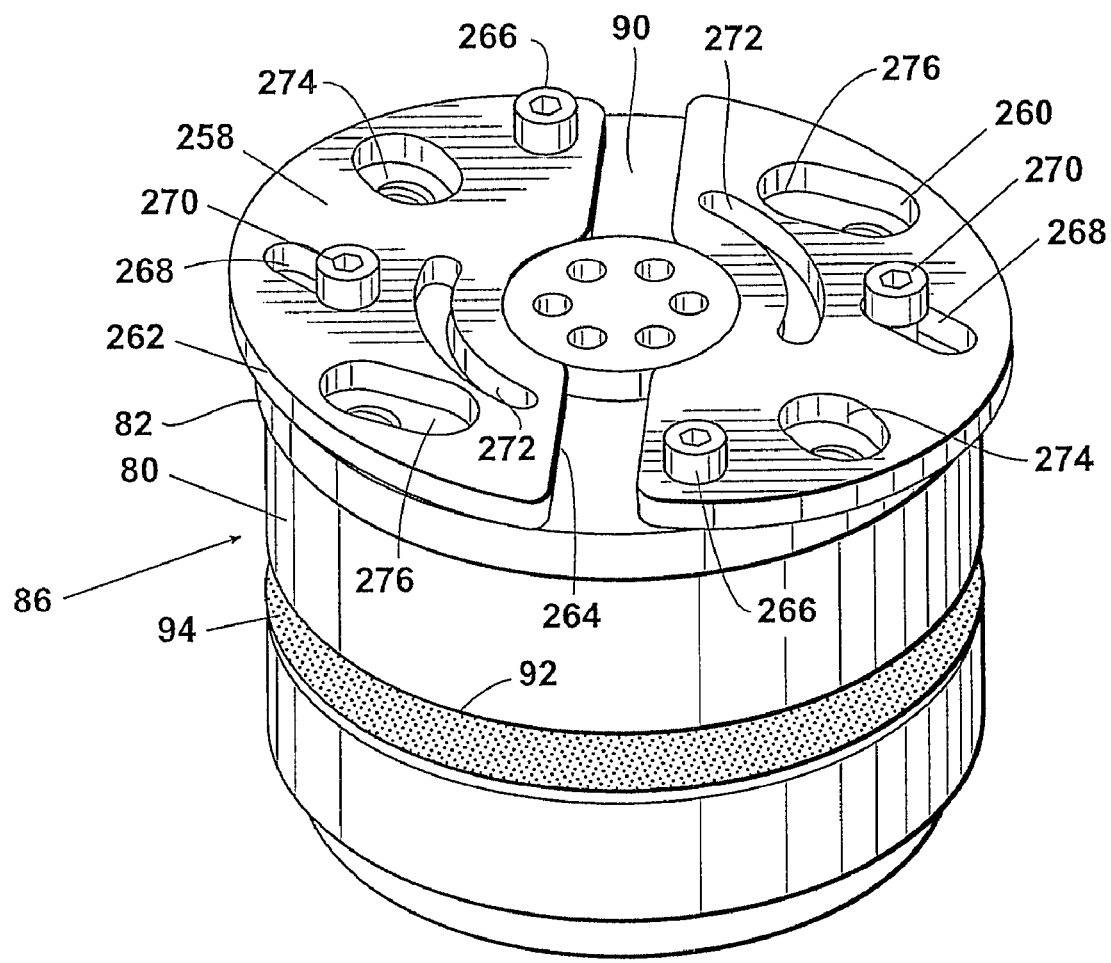
FIG. 4 is an isometric view of the plug body showing the first and second retainer leaves radially outwardly expanded as occurs when the plug member is in a closed and locked position within the cylindrical opening.

The leaves 258, 260 are made of flat plates of equal size that provide large surfaces to slide upon the planar top surface 90 of plug body 86 (see FIGS. 3 and 4). This substantially alleviates any problem of warpage or twisting that can happen with leaves of other configurations. Each leaf 258, 260 also has a substantially semicircular peripheral edge 262 and each has a substantially straight inner edge 264. Bolts 282 connect plug body 86 to plug holder 278.

Figure 5A:
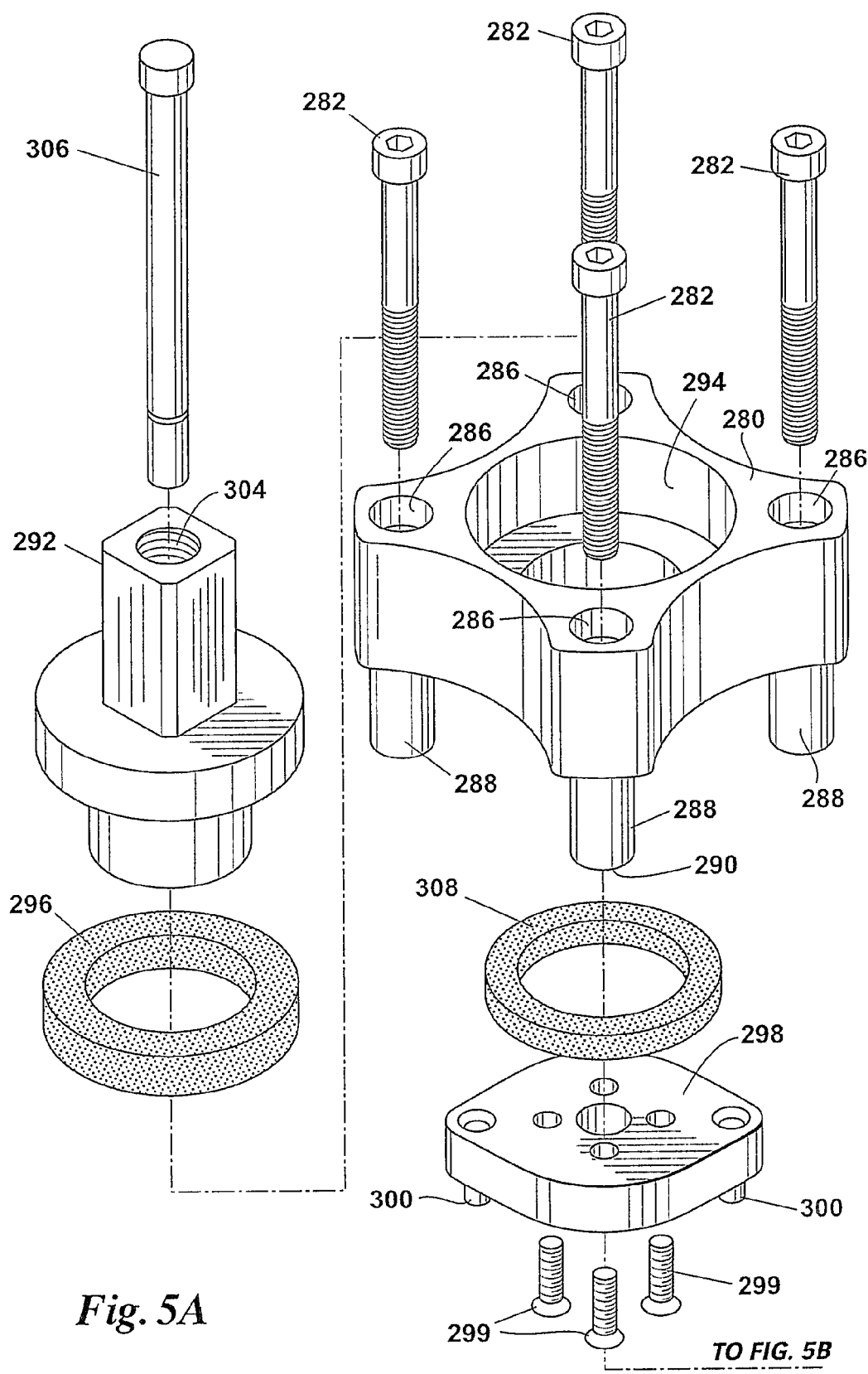
FIG. 5A is an exploded view of the plug holder. The plug holder rotatably receives an actuator.

Plug holder 278 has a flange portion 280 which has an opening 286 for each of bolts 282. Flange 280 further has, for each opening 286, integral tubular stand-offs 288. Stand-offs 288 have lower ends 290 (see FIG. 5A) that rest on plug body top surface 90 so that the main flange portion 280 of plug holder 278 is held above leaves 258, 260. Plug holder 278 includes a rotatable actuating portion 292 that is received in an opening 294 in flange portion 280. A bearing 296 provides for the easy rotation of actuating portion 292. Affixed to a lower end of actuating portion 292 is a plate 298 held in place by screws 299 so that actuating portion 292 remains rotatably secure to flange portion 280. An O-ring gasket 308 provides a seal between flange portion 280 and plate 298. Extending downwardly from plate 298 are two opposed boss portions 300. A rod 306 extends through a central opening 304 of the actuating portion.

Figure 5B:
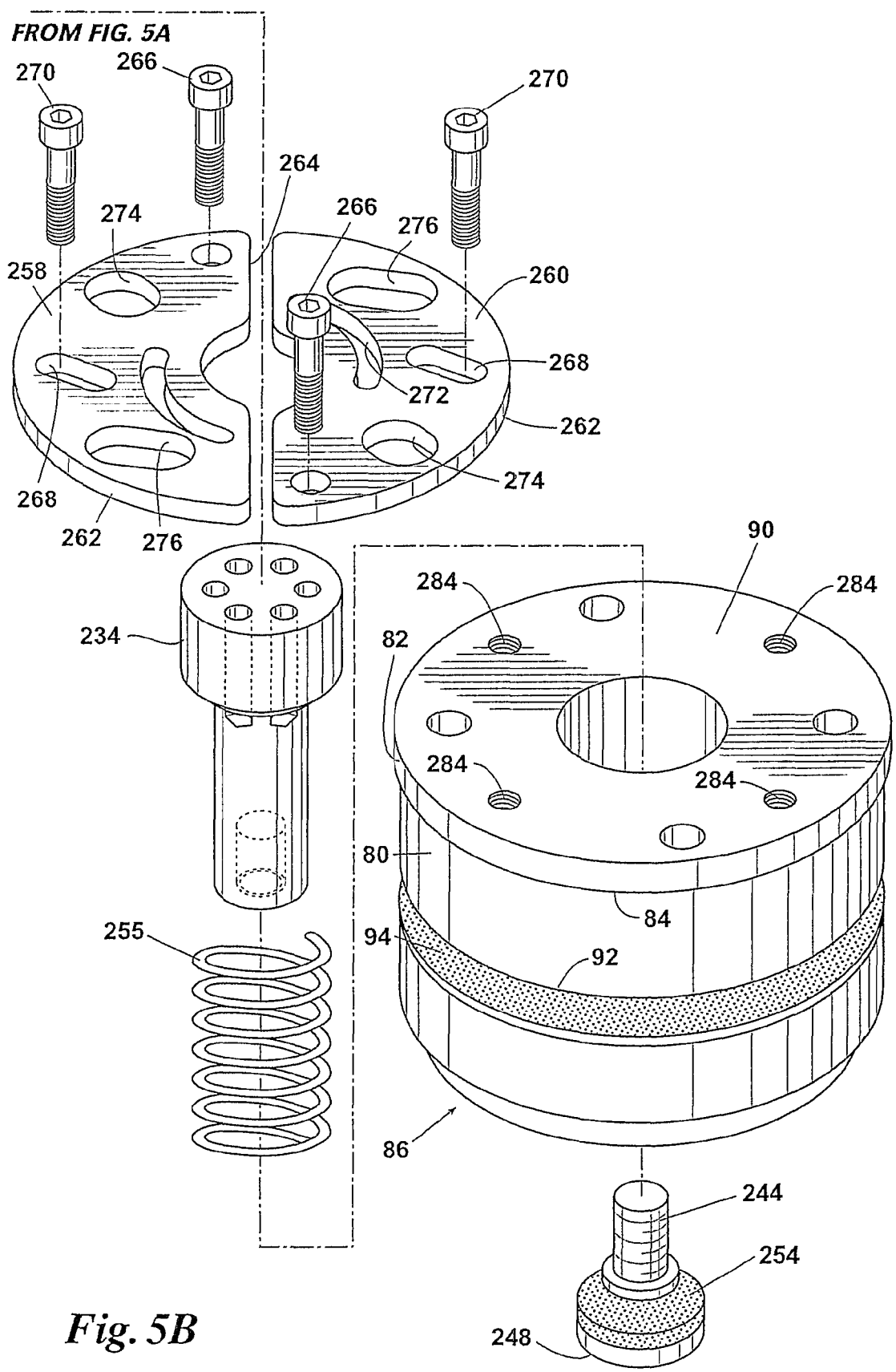
FIG. 5B is an exploded view of the plug body with the leaves in their open and unlocked position.

Referring to FIGS. 3 and 4, leaves 258, 260 are pivotal on plug body top surface 90, each leaf pivoting about a pivot pin 266. Pivot pins 266 are bolts extending through openings in the leaves 258, 260. Formed in each of the leaves 258, 260 are an arcuate guide slot 268, a first plug holder bolt slot 274, a second plug holder bolt slot 276, and a cam surface slot 272. Each slot 268 is formed in an arc relative to pivot pin 266. Guide bolts 270 extend through slots 268 and into a threaded opening 284 in top surface 90 of plug body 86 (see FIG. 5B). The heads of bolts 270 maintain leaves 258, 260 in slidable contact with plug body top surface 90. First plug holder bolt slot 274 is arcuate about pivot pin 266. Second plug holder bolt slot 276 communicates with the straight inner edge 264 of leaf 258, 260. The slots 274, 276 receive bolts 282 and bolts 282 thread into threaded recesses 284 in the top surface 90 of plug body 86. The cam surface slot 272 is eccentric with respect to the axis of pivot of each leaf 258, 260—that is, with respect to pivot pin 266—and with respect to the rotational axis of actuating portion 292 of plug holder 278. Boss portions 300 of plug holder 278 engage cam surface slots 272, and the interaction of boss portions 300 and cam surface slots 272 moves leaves 258 and 260 between their collapsed and expanded positions. In this manner, direct mechanical coupling is employed to move the leaves 258, 260.

Figure 8:
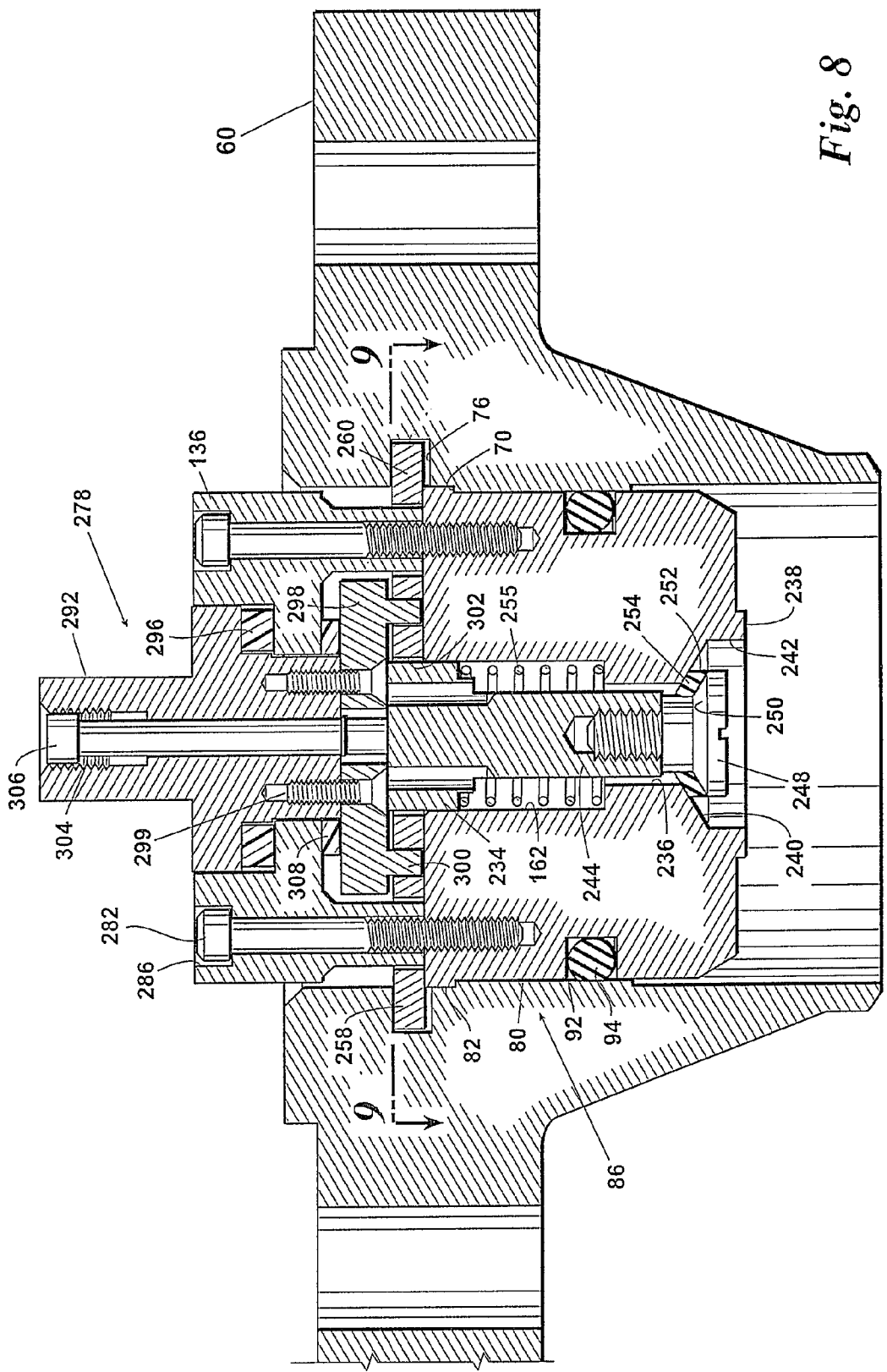
FIG. 8 is a cross-sectional view of the plug member in its closed and locked position within a cylindrical opening
Figure 9:
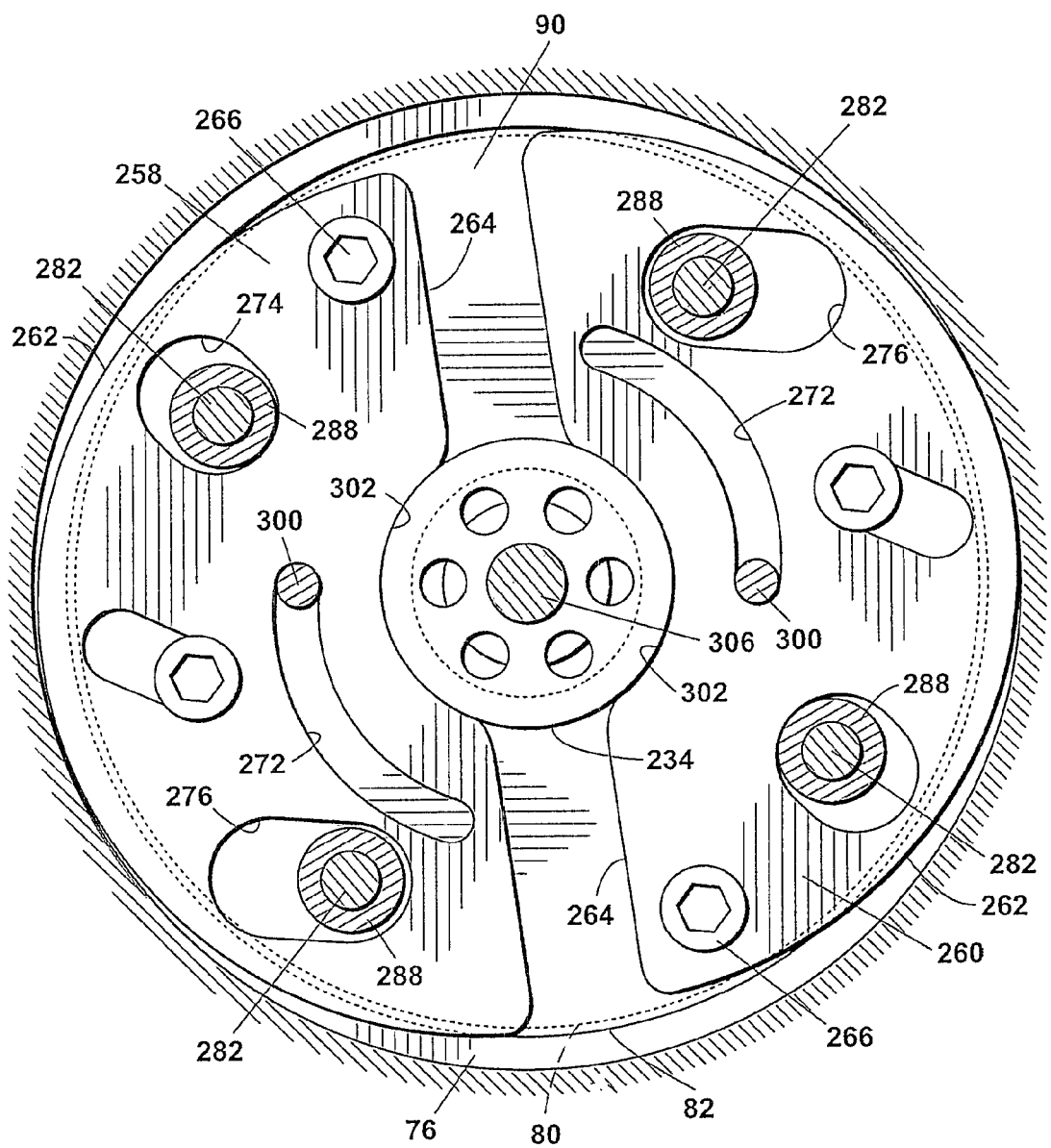
FIG. 9 is a view of the plug member taken along section line 9-9 of FIG. 8.

FIG. 3 shows the leaves 258, 260 in their collapsed position; their respective circumferential edge 262 is withdrawn within the confines of the external circumferential surface 82 of plug body 86. In the collapsed condition, the closure member may be inserted into or removed from a cylindrical opening such as that formed by flange 60. FIG. 4 shows the leaves 258, 260 in their expanded position; their respective circumferential edge 262 extends beyond the external circumferential surface 82 of plug body 86. When the closure member is positioned within flange 60, the leaves 258, 260 extend into a circumferential groove 76 (see FIGS. 6 and 8), thereby locking the closure member in position within flange 60. After plug body 86 is inserted into flange 60 (or any other cylindrical passageway to be closed), and after leaves 258 and 260 are moved to their expanded positions (as shown in FIG. 9), plug holder 278 may be removed by unthreading the four bolts 282, thereby allowing a cover to be placed over flange 60.

Figure 6:
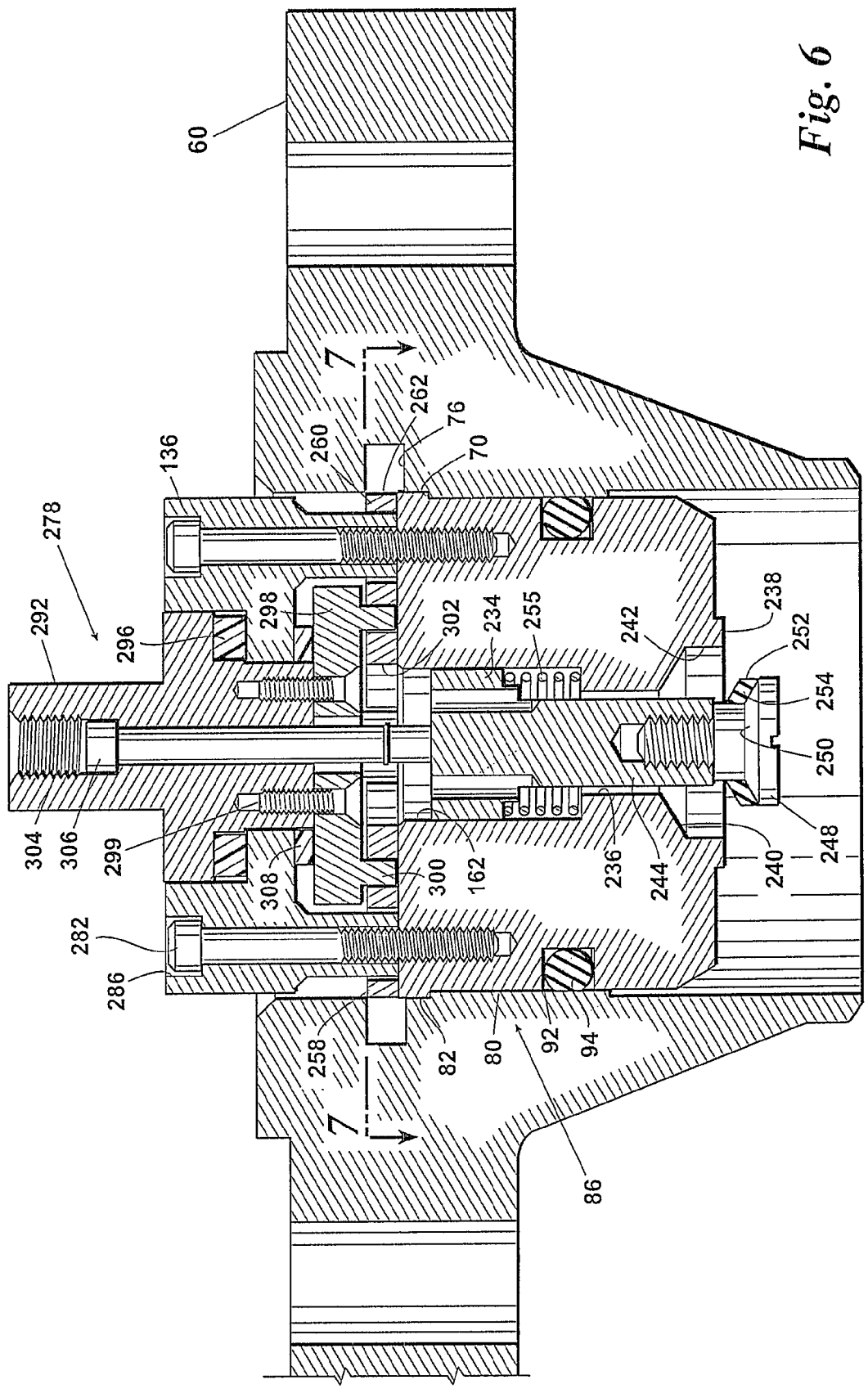
FIG. 6 is a cross-sectional view of the plug member in its open and unlocked position within a cylindrical opening and showing details of a pressure relief system.

As has been previously stated, it is important for safety reasons that any pressure below the closure member be relieved and equalized above and below the closure member before effort is made to release the closure member from its sealed position within the interior of a cylindrical opening. FIGS. 6 and 8 illustrate an embodiment of a pressure relief system. Plug body 86 has a reduced diameter opening 236 extending downwardly toward a bottom surface 238 of plug body 86. Reduced opening 236 is flared out into a frusto-conical opening 240 that communicates with a cylindrical lower opening 242. Plug body 86 also has a larger diameter opening 162 that contains a cylindrical guide 234. Cylindrical guide 234 is directly interposed between the straight edges 264 of the leaves 258, 260. To accommodate cylindrical guide 234, the straight inner edge 264 of each leaf 258, 260 has a shallow-depth semicircular recess 302 therein, substantially equal to the thickness of the leaf 258, 260 (see FIGS. 3 and 4). Because of cylindrical guide 234, leaves 258, 260 cannot be retracted to their collapsed position without passageway 236 being open to relieve any pressure across plug body 86.

A valve element has a stem portion 244 that is coaxially affixed to the bottom surface of a guide 234. Stem portion 244 integrally connects with a valve head portion 248 that has a frusto-conical valve sealing surface 250. Received in frusto-conical opening 240 is a circumferential groove 252 that receives a seal 254. A downward force on rod 306 urges valve stem 244, and thereby valve head 248, to the lower or valve open condition. A spring 255 urges valve stem 244, and thereby valve head 248, to the upper or valve closed condition.

Figure 7:
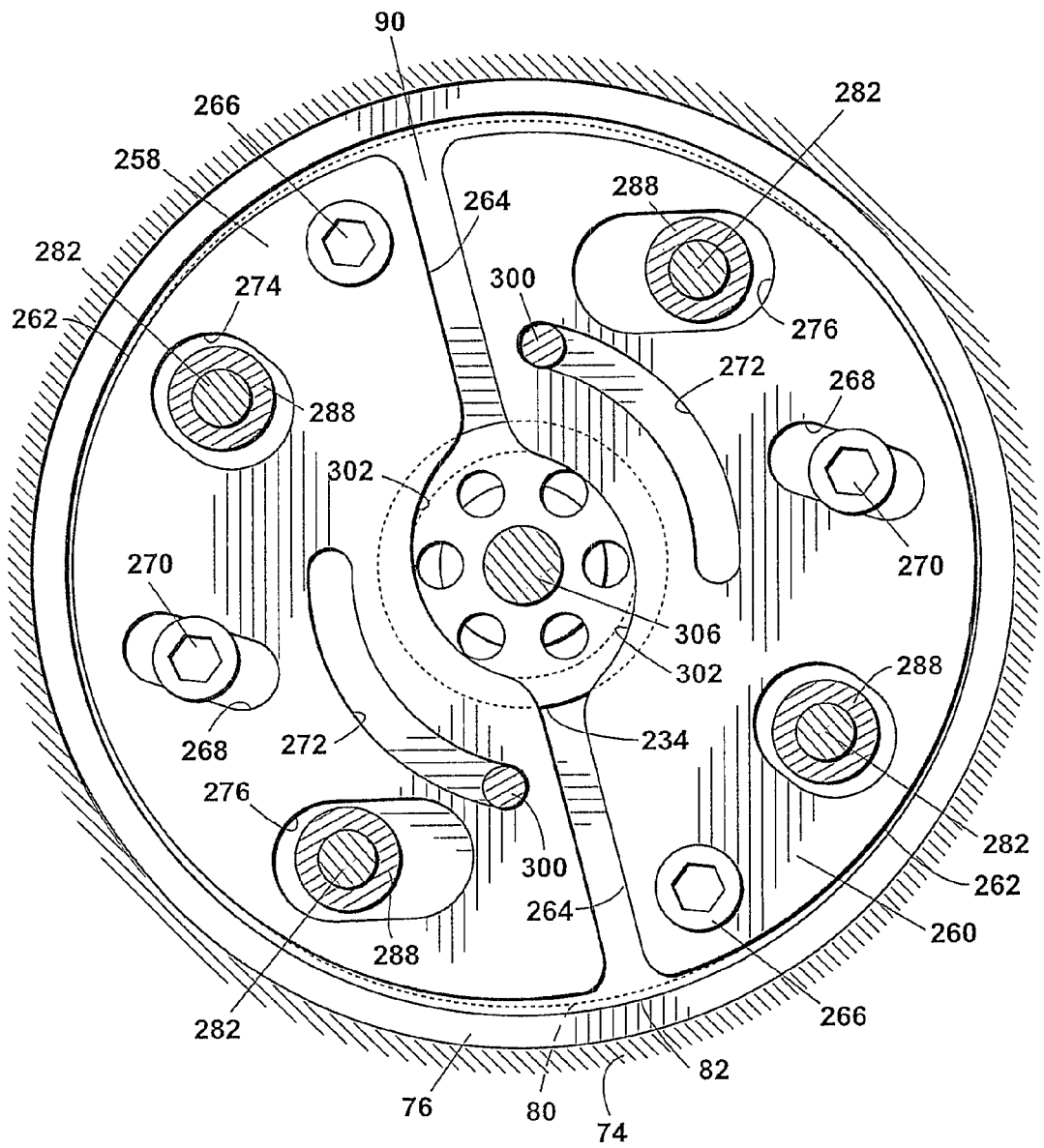
FIG. 7 is a view of the plug member in its open and unlocked position along section line 7-7 of FIG. 6.

When the leaves 258, 260 are in their expanded positions, spring bias valve head 248 is moved into a closed position closing passageway 236 through plug body 86. The upward movement of valve head 248 and stem 244 moves cylindrical guide 234 to an upward position as shown in FIG. 9. In this upward position, cylindrical guide 234 is positioned between the inner edges 264 of each of the plates 258, 260 thereby preventing the plates from moving from their expanded positions to their collapsed positions. Downward force on rod 306 depresses central guide 234 and thereby stem 244 having valve head 248 thereon to open a passage for fluid flow through opening 236 in plug body 86. The operator will know when flow through opening 236 ceases thereby indicating that pressure within flange 60 and above plug body 86 has been relieved. After the pressure is equalized, holding down on rod 306 and depressing cylindrical guide 234 allows rotatable portion 278 to be rotated to retract leaves 258, 260 and permit the removal of plug body 86 (see FIG. 7). The operator then may remove the closure member from within the flange thereby fully exposing the opening through the flange for any desired purpose.

Figure 10A:
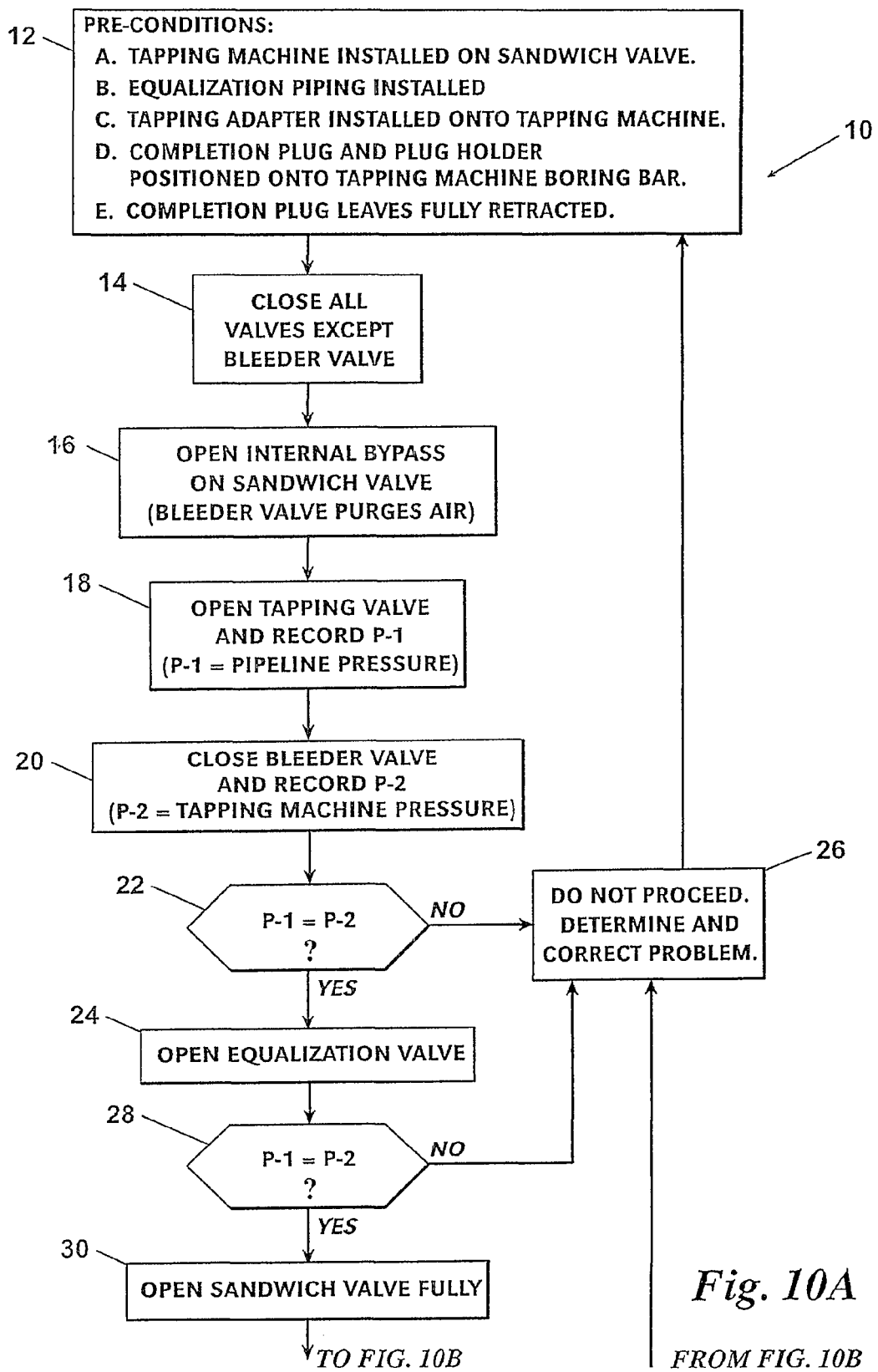
FIGS. 10A and 10B are a flow diagram of a process for verifying closing and locking of a plug member in a cylindrical passageway.
Figure 10B:
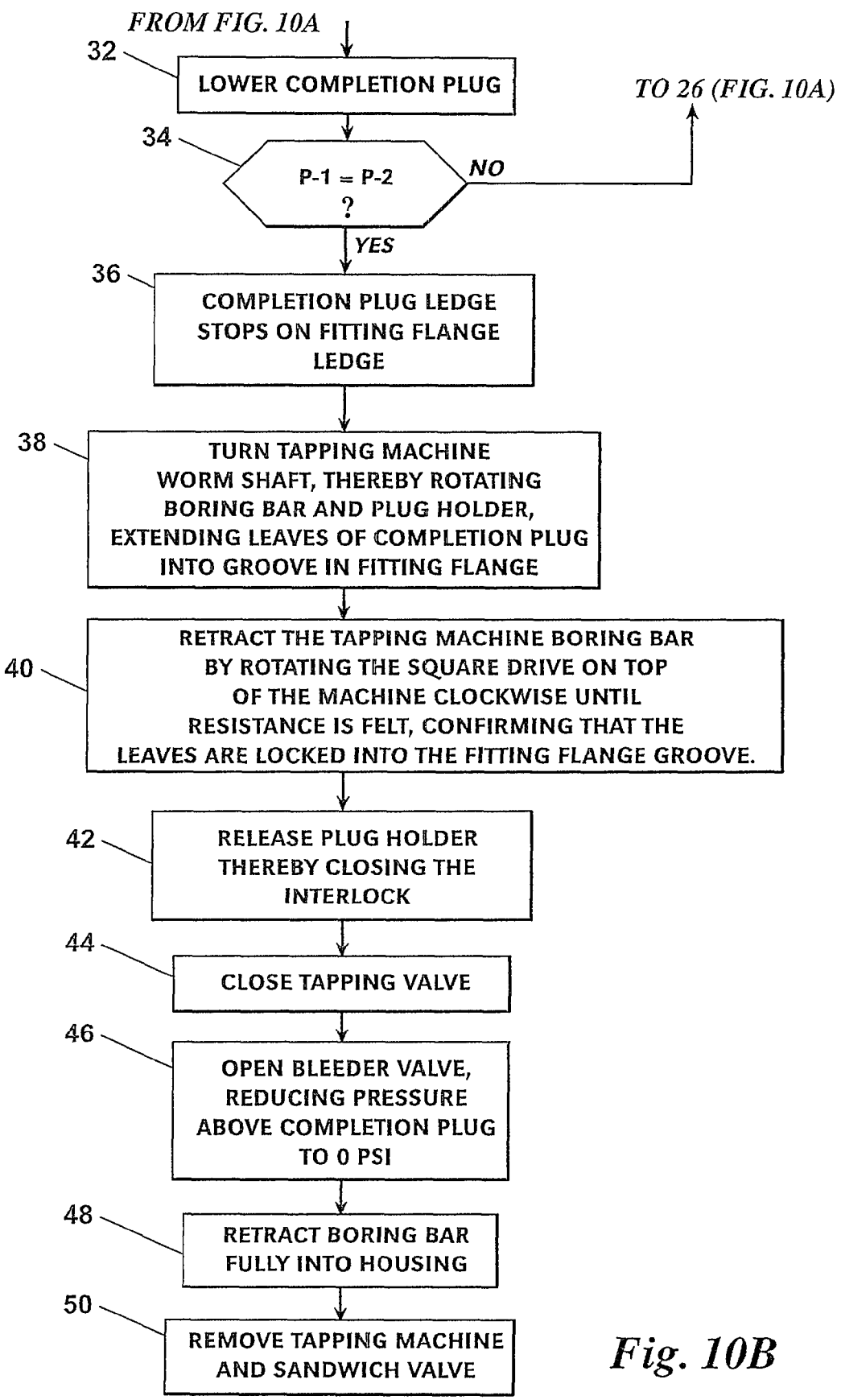

When inserting and orienting the closure member, however, the operator needs a method to verify the closure member is in its expanded position. Referring to FIG. 10A, in a preferred embodiment of a method for verifying the closure member is in its expanded position, the operator first establishes a set of pre-conditions 12 that includes installing tapping machine 100 onto sandwich valve 106, installing equalization piping 110, installing a tapping adapter (not shown) onto tapping machine 100, positioning the completion plug body 86 and plug holder 278 onto the boring bar (not shown) of tapping machine 100, and ensuring that leaves 258, 260 of completion plug body 86 are in the fully collapsed position. Once the preconditions are satisfied, step 14 occurs in which equalization valve 112, tapping valve 116, sandwich valve 106, and the internal bypass valve 108 are each closed. Bleeder valve 104, however, remains open. A series of valve opening steps, 16, 18, follow. Step 16 opens internal bypass valve 108 and records a pipeline pressure P-1 as indicated by pressure gauge 114. Step 18 opens tapping valve 116. Bleeder valve 104 then purges air from tapping machine 100. Step 20 closes bleeder valve 104 and records a tapping machine pressure P-2 as indicated by pressure gauge 102.

A series of pressure checking steps, 22, 28, and an interrelated series of valve opening steps 24, 30 then occur. Pressure check 22 determines whether pressure P-1 equals pressure P-2. If the two pressures P-1, P-2 are equal, then step 24 opens equalization valve 112 and a second pressure check 28 takes place. However, if pressure check 22 shows that the two pressures P-1, P-2 are not equal, then trouble shooting step 26 is performed to determine and correct the cause of unequal pressures P-1, P-2. After equalization valve 112 has been opened in step 24, a second pressure check 28 is conducted. If the two pressures P-1, P-2 remain equal, then step 30 opens sandwich valve 106. If the two pressures P-1, P-2 are not equal, sandwich valve 106 remains closed and trouble shooting step 26 is again performed.

With sandwich valve 106 in a fully opened position, lowering step 32 passes plug body 86 through sandwich valve 106 and into the cylindrical opening of fitting flange 60. Prior to plug body 86 coming to a complete stop within fitting flange 60, a third pressure check 34 is performed to determine whether the two pressures P-1, P-2 are equal. If the pressures P-1, P-2, not equal, trouble-shooting step 26 is once again performed. If the two pressures P-1, P-2 are equal, then plug body 86 is further lowered in step 36 until plug body 86 comes to a complete stop on circumferential ledge 70 located on an inner surface flange 60 (see FIG. 6).

Step 38 orients plug body 86 so that leaves 258, 260 are in their expanded positions. A worm shaft (not shown) of tapping machine 100 is rotated in a clockwise direction, thereby rotating the boring bar and plug holder 278. As plug holder 278 rotates, leaves 258, 260 extend outward from a centerline of plug body 86 and into circumferential groove 76 of fitting flange 60. Step 40 retracts the boring bar until resistance is felt to confirm leaves 258, 260 are in their expanded positions. If the leaves 258, 260 are in their expanded positions, then the upward travel of plug holder 278 is restricted. Step 42 releases plug holder 278, thereby closing the interlock.

After plug holder 278 has been released, step 42 isolates equalization piping 110 from pipeline 52 by closing tapping valve 116 and equalization valve 112. Step 46 opens bleeder valve 104 to purge air and pipeline product contained in tapping machine 100, thereby reducing pressure P-2 to 0 psi gauge. Step 48 retracts the boring bar fully and Step 50 removes tapping machine 100 and sandwich valve 106.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for verifying closing of a locking system of a cylindrical passageway, the method comprising the steps of:
    equalizing a tapping machine pressure and a pipeline pressure by isolating the tapping machine from the pipeline so as to prevent a product flow from one to the other;
    lowering a completion plug having one or more locking rings into a cylindrical passageway of a pipeline until a downward travel of the completion plug is restricted;
    orienting the completion plug within the passageway so that the locking ring is in a fully expanded position; and
    raising the completion plug until its upward travel within the passageway is restricted, the passageway being connected to a tapping machine via a sandwich valve, the sandwich valve having an internal bypass valve.

2. A method according to claim 1 further comprising the step of releasing the completion plug so as to maintain the locking ring in the fully expanded position.

3. A method according to claim 1 further comprising said equalizing pressure step including the step of allowing product to flow between the pipeline and the tapping machine.

4. A method according to claim 1 further comprising said equalizing pressure step including the step of purging substantially all air contained within the tapping machine.

5. A method according to claim 1 further comprising a reducing pressure step.

6. A method according to claim 5 further comprising said reducing pressure step including the steps of:

isolating for a second time the pipeline and tapping machine from one another so as to prevent a product flow from one to the other; and purging substantially all air contained in the tapping machine so that the tapping machine pressure is 0 psi gauge.

7. A method according to claim 1, wherein the tapping machine is connected to a second cylindrical passageway via an equalization piping.

8. A method according to claim 7, wherein the second cylindrical passageway is located downstream of the tapping machine relative to a product flow of the pipeline.

9. A method according to claim 7 further comprising the step of isolating the tapping machine from the equalization piping so as to prevent a product flow from one to the other.

10. A method according to claim 7 further comprising the step of allowing product to flow between the equalization piping and the tapping machine.

11. A method according to claim 1 further comprising said lowering step including the steps of:

attaching a completion plug to a boring bar of the tapping machine;

opening the sandwich valve to access the cylindrical passageway; and passing the completion plug through the sandwich valve and into a portion of the cylindrical passageway.

12. A method according to claim 11, wherein the cylindrical passageway comprises a circumferential ledge that prevents a continued downward travel of the completion plug through the passageway.

13. A method according to claim 1 further comprising said orienting step includes the step of rotating the completion plug so as to extend the locking ring outward from a centerline of the completion plug.

14. A method according to claim 13, wherein the locking ring extends into a circumferential groove located on an interior surface of the passageway.

15. A method according to claim 1 further comprising said raising step includes the step of rotating the completion plug a second time so as to cause the completion plug to travel upwardly within the passageway.

16. A method according to claim 1, wherein the locking ring is a retainer leaf.

* * * * *